(12) United States Patent
Yang et al.

(10) Patent No.: US 11,143,896 B2
(45) Date of Patent: Oct. 12, 2021

(54) TOUCH DEVICE AND TOUCH DISPLAY PANEL

(71) Applicant: AU OPTRONICS CORP., Hsin-Chu (TW)

(72) Inventors: Tun-Chun Yang, Hsin-Chu (TW); Seok-Lyul Lee, Hsin-Chu (TW); Wei-Ming Huang, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 207 days.

(21) Appl. No.: 16/035,260

(22) Filed: Jul. 13, 2018

(65) Prior Publication Data

US 2018/0321773 A1    Nov. 8, 2018

Related U.S. Application Data

(63) Continuation-in-part of application No. 14/884,769, filed on Oct. 16, 2015, now abandoned, which is a
(Continued)

(30) Foreign Application Priority Data

Dec. 11, 2008  (TW) .................................. 097148203

(51) Int. Cl.
*G09G 3/36*       (2006.01)
*G02F 1/1333*   (2006.01)
(Continued)

(52) U.S. Cl.
CPC .... *G02F 1/13338* (2013.01); *G02F 1/133512* (2013.01); *G06F 3/0412* (2013.01);
(Continued)

(58) Field of Classification Search
CPC ...... G06F 3/0412; G06F 3/044; G06F 3/0416; G06F 2203/04112; G06F 2203/04111;
(Continued)

(56) References Cited

U.S. PATENT DOCUMENTS 4,290,052 A * 9/1981 Eichelberger ........... G06F 3/044
341/33
4,743,895 A * 5/1988 Alexander ......... H03K 17/9622
345/174
(Continued)

FOREIGN PATENT DOCUMENTS

CN    1510479    7/2004
JP    5697138    8/1981
(Continued)

OTHER PUBLICATIONS

Dictionary.com, "adjacent," in Dictionary.com Unabridged. Source location: Random House, Inc. http://dictionary.reference.com/browse/adjacent, Nov. 18, 2011, p. 1.*
(Continued)

*Primary Examiner* — Jeff Piziali
(74) *Attorney, Agent, or Firm* — WPAT, PC

(57) ABSTRACT

A touch display panel comprises a first substrate, a plurality of first sensing series and a plurality of second sensing series, wherein both the first sensing series and the second sensing series are above the first substrate, and the first sensing series and the second sensing series are crossly arranged to form a plurality of sensing series openings in between, a first insulating layer, covering the first sensing series and the second sensing series, a patterned black matrix layer, comprising a plurality of black matrix openings arranged in a matrix formation, a second insulating layer, covering the patterned black matrix layer; and a patterned common electrodes layer. The plurality of sensing series
(Continued)

openings, the plurality of black matrix openings, and the patterned common electrode layer are overlapped.

19 Claims, 7 Drawing Sheets

Related U.S. Application Data continuation of application No. 12/434,681, filed on May 3, 2009, now abandoned.

(51) Int. Cl.
*G06F 3/041* (2006.01)
*G02F 1/1335* (2006.01)
*G06F 3/044* (2006.01)
*G02F 1/1343* (2006.01)

(52) U.S. Cl.
CPC .......... *G06F 3/0443* (2019.05); *G06F 3/0446* (2019.05); *G09G 3/36* (2013.01); *G02F 1/134318* (2021.01); *G06F 2203/04106* (2013.01); *G06F 2203/04111* (2013.01); *G06F 2203/04112* (2013.01)

(58) Field of Classification Search
CPC .......... G06F 2203/04106; G06F 3/0443; G06F 3/0446; G02F 1/133512; G02F 1/13338; G02F 2001/134318; G02F 1/134318; G09G 3/36
See application file for complete search history.

(56) References Cited

U.S. PATENT DOCUMENTS

| | | | |
|---|---|---|---|
| 5,459,596 A * | 10/1995 | Ueda | G02F 1/136213 349/111 |
| 5,600,461 A * | 2/1997 | Ueda | G02F 1/136213 349/38 |
| 6,057,903 A | 5/2000 | Colgan et al. | |
| 6,259,490 B1 * | 7/2001 | Colgan | G02F 1/13338 349/12 |
| 6,452,657 B1 | 9/2002 | Suzuki et al. | |
| 6,771,327 B2 | 8/2004 | Sekiguchi | |
| 6,876,355 B1 | 4/2005 | Ahn et al. | |
| 6,970,160 B2 | 11/2005 | Mulligan et al. | |
| 7,129,935 B2 | 10/2006 | Mackey | |
| 7,199,514 B2 | 4/2007 | Yoneda | |
| 7,557,869 B2 | 7/2009 | Bang et al. | |
| 7,649,525 B2 | 1/2010 | Chen et al. | |
| 7,781,850 B2 | 8/2010 | Miles et al. | |
| 7,924,350 B2 | 4/2011 | Ma et al. | |
| 8,013,943 B2 | 9/2011 | Tanaka et al. | |
| 2004/0090582 A1 | 5/2004 | Ikeda et al. | |
| 2004/0135773 A1 | 7/2004 | Bang et al. | |
| 2004/0217945 A1 * | 11/2004 | Miyamoto | G06F 3/0412 345/173 |
| 2006/0262236 A1 | 11/2006 | Abileah | |
| 2007/0074913 A1 * | 4/2007 | Geaghan | G06F 3/044 178/18.06 |
| 2009/0046077 A1 * | 2/2009 | Tanaka | G06F 3/0412 345/174 |

FOREIGN PATENT DOCUMENTS

| | | |
|---|---|---|
| JP | 5224813 | 9/1993 |
| KR | 20020063985 | 8/2002 |
| WO | WO2007102238 | 7/2009 |

OTHER PUBLICATIONS

Dictionary.com, "adjacent." in Dictionary.com Unabridged. Source location: Random House, Inc. Retrieved from http://dictionary.reference.com/browse/adjacent, Nov. 18, 2011, p. 1.

Notice of Allowance dated Sep. 27, 2012 for the Taiwan application No. 097148203, filing date Dec. 11, 2008, p. 1-4.

* cited by examiner

TOUCH DEVICE AND TOUCH DISPLAY PANEL

CLAIM OF PRIORITY

This application is a continuation in part of U.S. patent application Ser. No. 14/884,769, which is a continuation of U.S. patent application Ser. No. 12/434,681, which claims foreign priority to Taiwanese Patent Application No. 097148203 filed Dec. 11, 2008.

FIELD OF THE INVENTION

The present invention relates to a touch device and a touch display panel.

DESCRIPTION OF THE PRIOR ART

LCD (liquid crystal display) is one type of flat display, popular on the market for its characteristics of power saving, thinness, and light weight. In any kind of electronic device that includes an LCD, such as a media player, mobile phone or personal digital assistant (PDA), a touch input function of the LCD is becoming more popular, with the result that touch panels are now in widespread use.

Conventional touch display panels are mainly classified into resistance-type touch display panels and capacitor-type touch display panels. The resistance-type touch display panel tracks the contact position through a voltage difference or a voltage variation. The capacitor-type touch display panel usually includes sensing capacitors, and tracks the contact position through the capacitance variation of the sensing capacitor located at the contact position. The conventional touch display panels are manufactured by individually manufacturing a touch panel and a liquid crystal panel and assembling the touch panel and the liquid crystal display panel together. For this reason, there are shortcomings in the conventional touch display panels, such as heavy weight, high cost and low transmittance etc. In order to improve the shortcomings, a touch device and a display device that are manufactured in a same display panel has recently been developed, and a liquid crystal panel with the touch input function can thereby be formed. The touch device of the conventional touch display panel is generally disposed between a substrate and the display device, so that sensing pads in the touch device and a common electrode on a color filter substrate of the liquid crystal panel form a coupling capacitor. Therefore, the sensing pads are affected by the coupling capacitor when a finger touches the conventional touch display panel, and a problem of insufficient intensity of the sensing signal occurs.

SUMMARY OF THE INVENTION

It is therefore an objective of the present invention to provide a touch device and a touch display panel so as to reduce a coupling capacitance between a sensing electrode and a common electrode to increase intensity of a sensing signal.

According to an embodiment of the present invention, a touch display panel is provided, comprising a first substrate, a plurality of first sensing series and a plurality of second sensing series, wherein both the first sensing series and the second sensing series are above the first substrate, and the first sensing series and the second sensing series are crossly arranged to form a plurality of sensing series openings in between, a first insulating layer, covering the first sensing series and the second sensing series, a patterned black matrix layer, comprising a plurality of black matrix openings arranged in a matrix formation, a second insulating layer, covering the patterned black matrix layer; and a patterned common electrodes layer. The plurality of sensing series openings, the plurality of black matrix openings, and the patterned common electrode layer are overlapped.

According to an embodiment of the present invention, the patterned black matrix layer defining displaying regions and a light shielding region, and the plurality of black matrix openings corresponding to the displaying regions, and the patterned common electrode layer is disposed on the first insulating layer, and is comprising a plurality of electrode portions corresponding to the displaying regions and a plurality of connecting portions, the connecting portions are disposed between the adjacent electrode portions and over the light-shielding region, and the connecting portions are electrically connected to the electrode portions.

According to an embodiment of the present invention, the plurality of first sensing series is perpendicular to the plurality of second sensing series.

According to an embodiment of the present invention, each first sensing series and each second sensing series have a plurality of sensing pads and a plurality of bridge lines.

According to an embodiment of the present invention, the touch device further comprising a patterned transparent floating-electrode layer, disposed between the first substrate and the plurality first sensing series.

According to an embodiment of the present invention, the patterned transparent floating-electrode layer comprises a plurality of electrode sections, respectively corresponding to at least one of the sensing pads.

According to an embodiment of the present invention, the second insulating layer is disposed between the patterned transparent floating-electrode layer and the plurality of first sensing series.

According to an embodiment of the present invention, the patterned common electrode layer, comprising a meshed pattern, is composed of the electrode portions and the connecting portions.

According to an embodiment of the present invention, a patterned anti-reflective layer, disposed between the plurality of first sensing series and the first substrate, wherein the patterned anti-reflective layer overlaps the plurality of first sensing series and the plurality of second sensing series.

According to an embodiment of the present invention, the plurality of first sensing series is narrower than the corresponding patterned black matrix layer.

According to the claimed invention, a touch display panel is provided, comprising a first substrate, a second substrate, a liquid crystal layer, disposed between the first substrate and the second substrate, a patterned sensing electrode structure, disposed above the surface of the first substrate, and the patterned sensing electrode structure corresponding to a light-shielding region and exposing displaying regions, a first insulating layer, covering the patterned sensing electrode structure; and a patterned common electrode layer, disposed on the first insulating layer, comprising a plurality of electrode portions corresponding to the displaying regions and a plurality of connecting portions, the connecting portions being disposed between the adjacent electrode portions and electrically connected to the electrode portions.

According to an embodiment of the present invention, the patterned sensing electrode structure comprises a plurality of first sensing series and a plurality of second sensing series, and the plurality of first sensing series is perpendicular to the plurality of second sensing series.

According to an embodiment of the present invention, each first sensing series and each second sensing series have a plurality of sensing pads and a plurality of bridge lines.

According to an embodiment of the present invention, a patterned transparent floating-electrode layer, disposed between the first substrate and the patterned sensing electrode structure.

According to an embodiment of the present invention, a second insulating layer disposed between the patterned transparent floating-electrode layer and the patterned sensing electrode structure.

According to an embodiment of the present invention, the patterned transparent floating-electrode layer comprises a plurality of electrode sections, respectively corresponding to at least one of the sensing pads.

According to an embodiment of the present invention, the patterned common electrode layer, comprising a meshed pattern, is composed of the electrode portions and the connecting portions.

According to an embodiment of the present invention, a patterned anti-reflective layer, disposed between the patterned sensing electrode structure and the first substrate, wherein the patterned anti-reflective layer overlaps with the plurality of first sensing series and the plurality of second sensing series.

According to an embodiment of the present invention, a color filter layer, disposed on the first insulating layer; a patterned black matrix layer, disposed on the color filter layer, wherein the patterned black matrix layer exposes the displaying regions; and a third insulating layer, covering the patterned black matrix layer and the color filter layer.

According to an embodiment of the present invention, the patterned sensing electrode structure is narrower than the corresponding patterned black matrix layer.

The present invention provides the patterned sensing electrode structure corresponding to the light-shielding region combined with the electrode portions of the patterned common electrode layer, and reduces the area of the connecting portions, so that the overlap between the patterned sensing electrode structure and the patterned common electrode layer can be reduced. The coupling capacitance between the patterned sensing electrode structure and the patterned common electrode layer can therefore be reduced, and the intensity of the sensing signal sensed from the patterned sensing electrode structure can be increased accordingly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
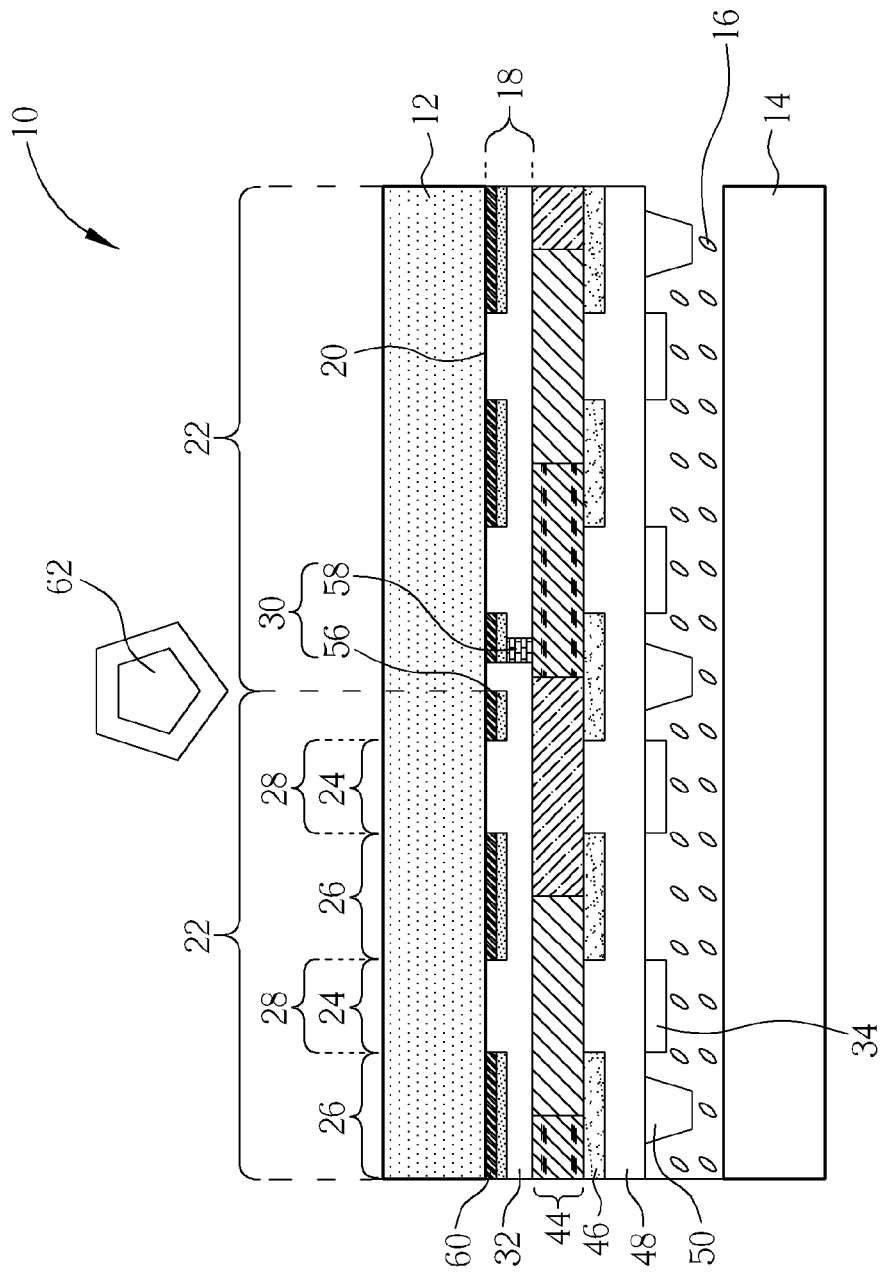
FIG. 1 is a schematic diagram illustrating a cross-sectional structure of a touch display panel according to a first preferred embodiment of the present invention.
Figure 2:
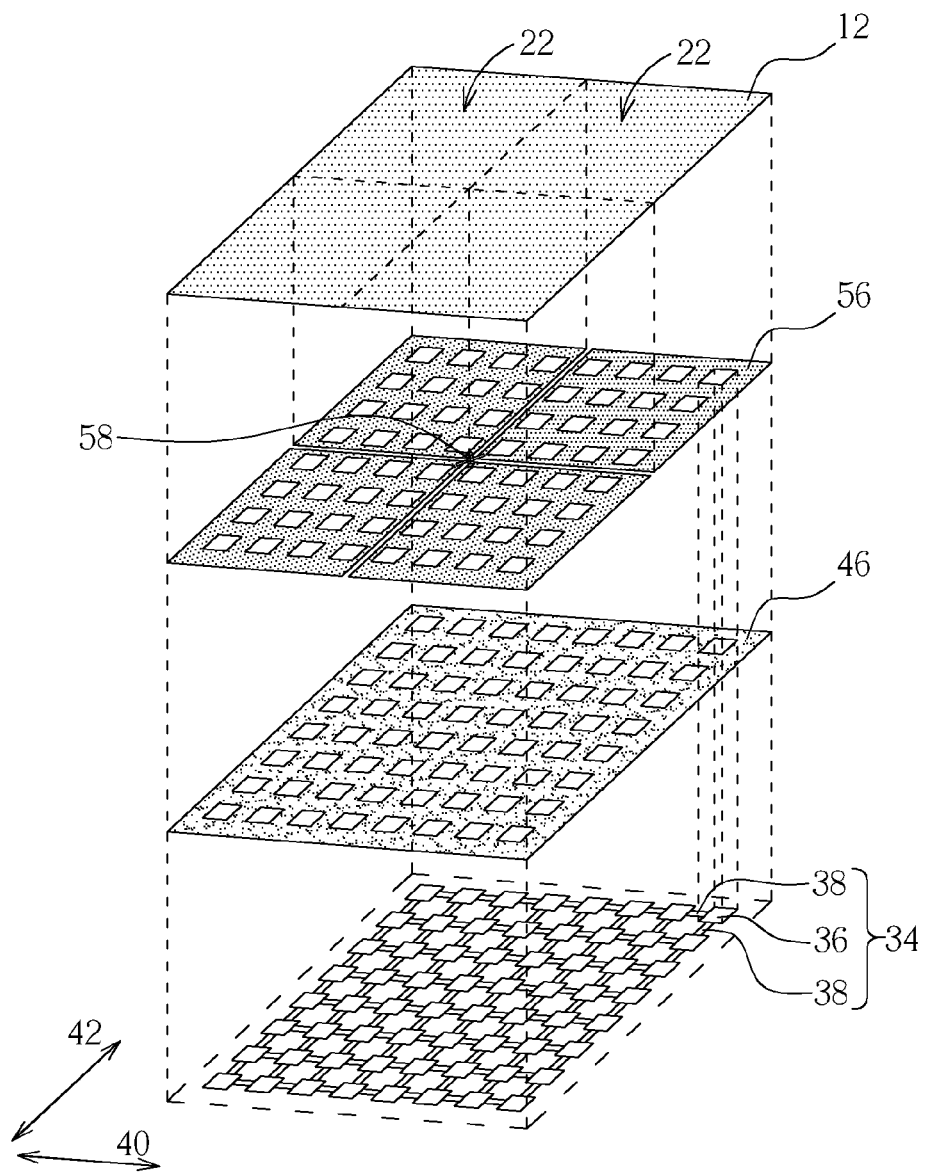
FIG. 2 is a schematic diagram illustrating a structure of the touch display panel according to the first preferred embodiment of the present invention.

Referring to FIG. 1 and FIG. 2, FIG. 1 is a schematic diagram illustrating a cross-sectional structure of a touch display panel according to a first preferred embodiment of the present invention, and FIG. 2 is a schematic diagram illustrating the touch display panel according to the first preferred embodiment of the present invention. As shown in FIG. 1 and FIG. 2, the touch panel 10 includes a first substrate 12, a second substrate 14, a liquid crystal layer 16, and a touch device 18. The first substrate 12 and the second substrate 14 are parallel to each other, and the first substrate 12 has a surface 20 facing the second substrate 14. The surface 20 of the substrate 12 defines a plurality of sensing regions 22, and each sensing region 22 defines a plurality of displaying regions 24 arranged as a matrix formation and a light-shielding region 26 disposed between the displaying regions 24. The first substrate 12 can be a transparent substrate, such as glass substrate, quartz substrate or plastic substrate, and the second substrate 14 can be a thin film transistor (TFT) substrate, and the second substrate 14 can control the display of the displaying region 24, but the embodiment is not limited to this. The first substrate 12 and the second substrate 14 should be known by one skilled in the art, and will therefore not be described here. In addition, the liquid crystal layer 16 is disposed between the first substrate 12 and the second substrate 14. The surface 20 of the first substrate 12 further defines a plurality of sub-pixels 28 arranged as a matrix formation, and the sub-pixels respectively correspond to each displaying region 24.

In addition, as shown in FIG. 1, the touch device 18 is fabricated on the surface 20 of the first substrate 12, and the touch device 18 includes a patterned sensing electrode structure 30, a first insulating layer 32 and a patterned common electrode layer 34. The first insulating layer 32 covers the surface 20 of the first substrate 12 and the patterned sensing electrode structure 30, and the patterned common electrode layer 34 is disposed on the first insulating layer 32. Furthermore, as shown in FIG. 2, the patterned common electrode layer 34 includes a plurality of electrode portions 36 corresponding to the displaying regions 24 and a plurality of connecting portions 38. The connecting portions 38 are respectively disposed between the adjacent electrode portions and over the light-shielding region 26, and the connecting portions 38 are electrically connected to the electrode portions 36. In this embodiment, the patterned common electrode layer 34 includes a meshed pattern or a plurality of strip-shaped patterns parallel to each other, and the meshed pattern or the strip-shaped patterns are composed of the electrode portions 36 and the connecting portions 38. A width of each connecting portion 38 is smaller than a width of each electrode portion 36. In the present invention, the connecting portions 38 also can connect the adjacent electrode portions 36 only disposed in a first horizontal direction 40 or only disposed in a second horizontal direction 42, and the first horizontal direction 40, such as the X direction, is substantially perpendicular to the second horizontal direction 42, such as the Y direction. In addition, the patterned common electrode layer 34 can be composed of a transparent conductive material, such as indium-tin oxide (ITO) or indium-zinc oxide (IZO), but the embodiment is not limited to these materials.

As shown in FIG. 1, the touch device 18 can further include a color filter layer 44, a patterned black matrix layer 46, a third insulating layer 48 and a plurality of spacers 50. The color filter layer 44 is disposed on the first insulating layer 32, and the color filter layer 44 includes a plurality of red color filters, a plurality of green color filters and a plurality of blue color filters. Each red color filter, each green color filter and each blue color filter respectively correspond to each sub-pixel 28, and three colors can form a pixel. The patterned black matrix layer 46 is disposed on the color filter layer 44, and the patterned black matrix layer 46 exposes the displaying region 24. The patterned black matrix layer 46 can be composed of light-shielding materials, such as metal or black resin. The third insulating layer 48 covers the patterned black matrix layer 46 and the color filter layer 44, and the third insulating layer 48 is disposed between the patterned common electrode layer 34 and the patterned black matrix layer 46 and between the patterned common electrode layer 34 and the color filter layer 44, so that the third insulating layer 48 can be an overcoat. The spacer 50 is disposed on the third insulating layer 48 and disposed between the patterned common electrodes 34.

Figure 3:
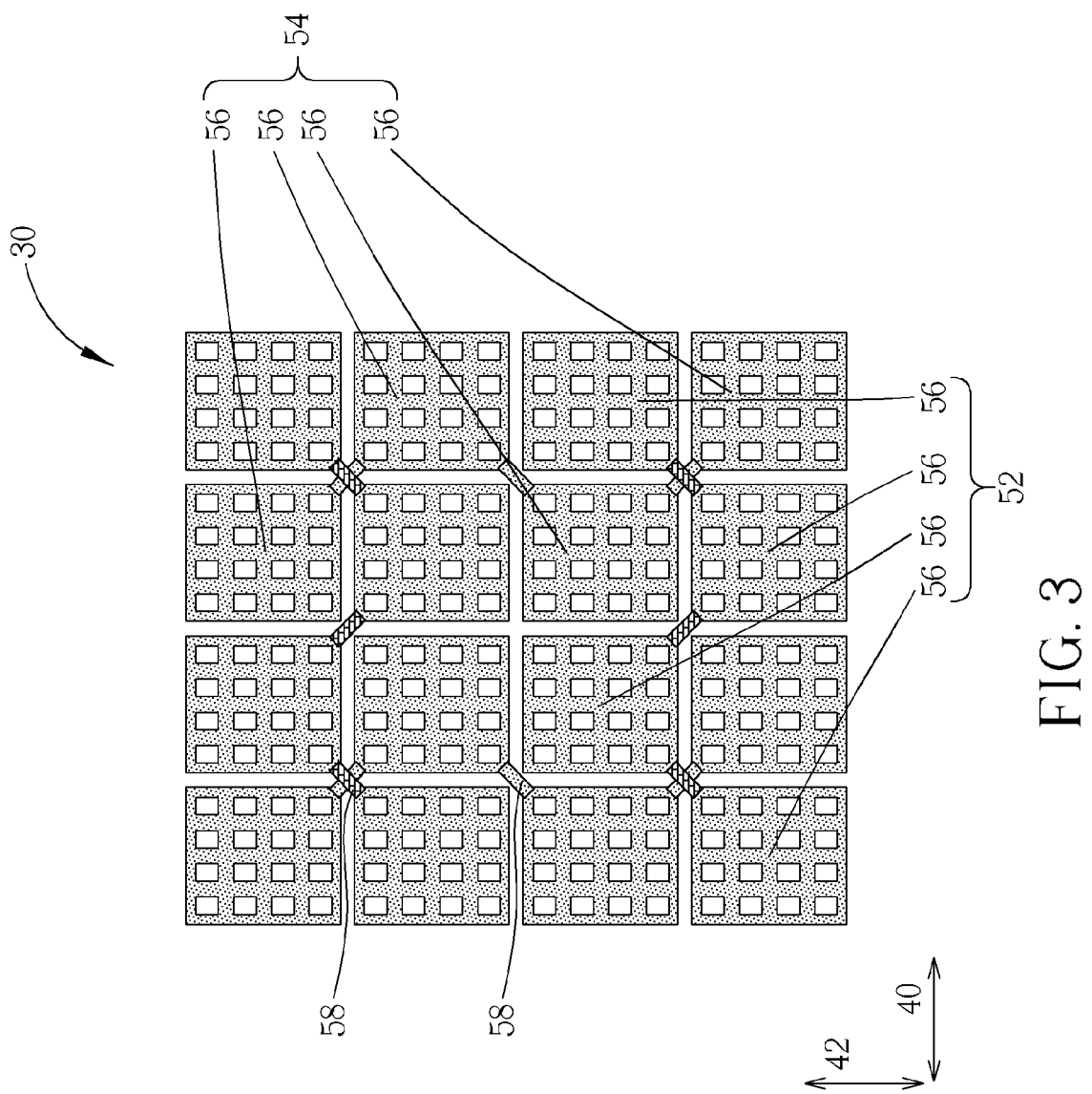
FIG. 3 is a schematic diagram illustrating a top-view of the patterned sensing electrode structure of the present invention.

In addition, as shown in FIG. 1, the patterned sensing electrode structure 30 is disposed on the surface of the first substrate 20. The patterned sensing electrode structure 30 corresponds to the light-shielding region 26, and exposes the displaying region 24. For clearly describing the pattern of the patterned sensing electrode structure 30, please refer to FIG. 3, which is a schematic diagram illustrating a top-view of the patterned sensing electrode structure of the present invention. As shown in FIG. 3, the patterned sensing electrode structure 30 of this embodiment includes a plurality of first sensing series 52, such as X sensing series, and a plurality of second sensing series 54, such as Y sensing series, and each first sensing series 52 and each second sensing series 54 respectively have a plurality of sensing pads 56 and a plurality of bridge lines 58. The bridge lines 58 of each second sensing series 54 electrically connect the sensing pads 56 in the same second sensing series 54 along the first horizontal direction 40, and the bridge lines 58 of each first sensing pad 52 electrically connect the sensing pads in the same first sensing electrode 52 along the first horizontal direction 42. In this embodiment, the bridge lines 58 of the first sensing series 52 and the sensing pads 56 of the first sensing series 52 and the second sensing series 54 belong to a first metal layer, and the first metal layer is disposed on the first substrate 12. The bridge lines 58 of the second sensing series 54 belong to a second metal layer, and the second metal layer is disposed on the first substrate 12. The first metal layer is disposed on the second metal layer. In this embodiment, each sensing region 28 respectively includes one sensing pad 56, but the embodiment is not limited to this. Each sensing region 28 of the present invention can include at least one sensing pad 56 of the first sensing series 52 or the second sensing series 54. For example, the sensing region 28 includes four adjacent sensing pads 56 arranged as a matrix formation. In addition, the patterned sensing electrode structure 30 can be molybdenum (Mo), aluminum (Al), chromium (Cr) or an alloy thereof, such as an alloy of Mo and Al or other conductive materials, but the embodiment is not limited to this.

In other embodiment, the bridge lines 58 of the first sensing series 52 and the sensing pads 56 of the first sensing series 52 and the second sensing series 54 belong to a first conductive layer, and the first conductive layer is disposed on the first substrate 12. The bridge lines 58 of the second sensing series 54 belong to a second conductive layer. In one embodiment, patterned sensing electrode structure 30 is a capacitor-type touch panel. The first sensing series 52 and the second sensing series 54 are separate from each other. In one embodiment, the first sensing series 52 is used to provide the sensing signal and the second sensing series 54 is used to receive the sensing signal. In one embodiment, the first sensing series 52 is used to provide the sensing signal and the second sensing series 54 is used to receive the sensing signal.

Referring to FIG. 1 again, it should be noted that the touch device 18 further includes a patterned anti-reflective layer 60, which has the same pattern as the patterned sensing electrode structure 30, and the patterned anti-reflective layer 60 is disposed between the patterned sensing electrode structure 30 and the first substrate 12. The patterned anti-reflective layer 60 can be composed of anti-reflective materials, such as metal oxide, so as to efficiently avoid generating a glare and dazzling effect while illuminating the patterned sensing electrode structure 30.

Referring to the structure of the touch display panel 10 of the above-mentioned embodiment, when the touch input unit 62, such as a finger, touches the surface in the sensing region 28 of the touch display panel 10 from the outside, the sensing pad 56 in the sensing region 28 generates a sensing signal, so that a position of the sensing region 28 can be determined. In addition, the electrode portions 36 of the patterned common electrode layer 34 in this embodiment corresponds to the displaying region 24, and the patterned sensing electrode structure 30 corresponds to the light-shielding region 26, so that the overlap between the patterned common electrode layer 34 and the patterned sensing electrode structure 30 can be reduced so as to help reduce the coupling capacitance between the patterned common electrode layer 34 and the patterned sensing electrode structure 30. The intensity of the generated sensing signal can therefore be increased, and the sensing signal generated from the sensing pad 56 can be prevented from being affected by the coupling capacitor between the patterned common electrode layer 34 and the patterned sensing electrode structure 30.

Figure 4:
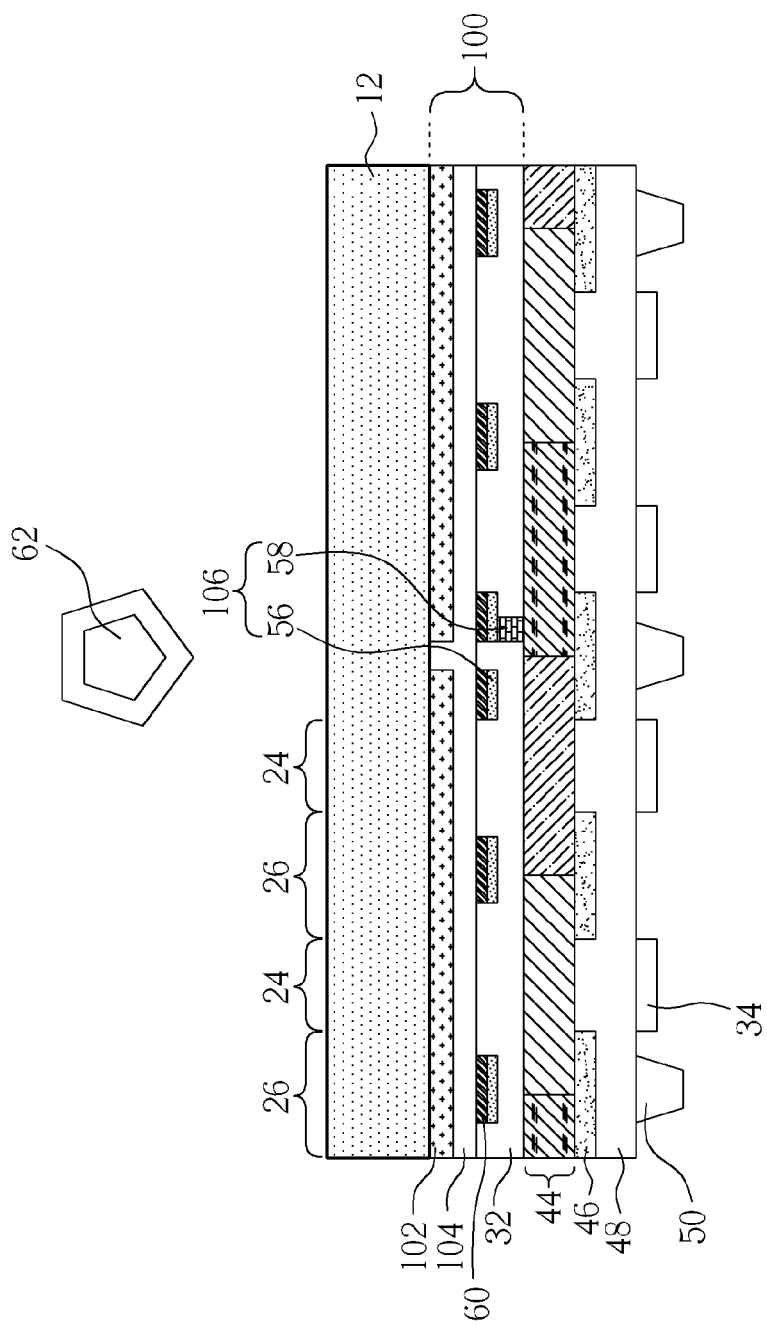
FIG. 4 is a schematic diagram illustrating a cross-sectional structure of a touch device according to a second preferred embodiment of the present invention.
Figure 5:
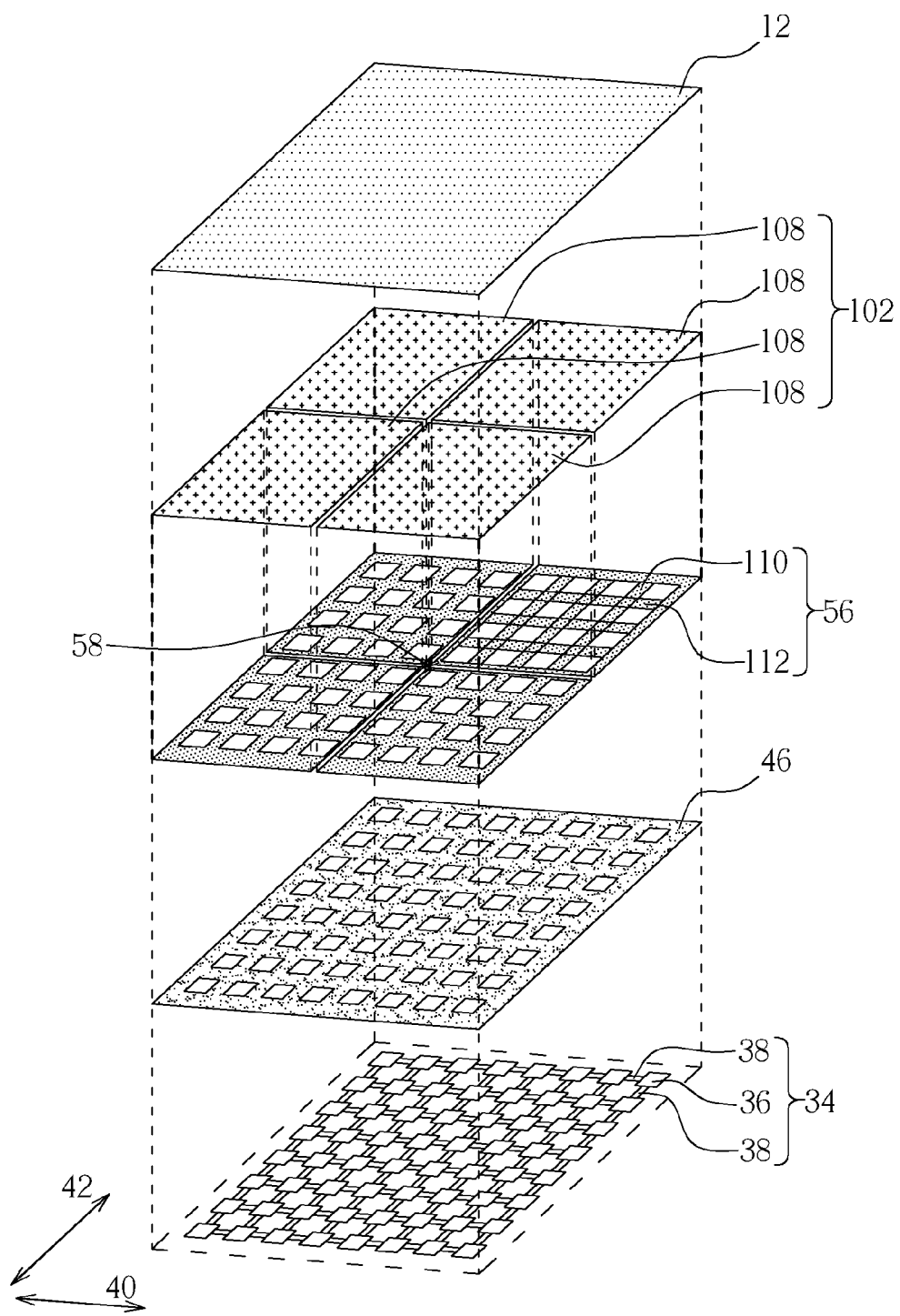
FIG. 5 is a schematic diagram illustrating a structure of the touch device according to the second preferred embodiment of the present invention.

Besides the above-mentioned first preferred embodiment, the present invention has other embodiments, which are described in the following. In order to compare the difference between the embodiments, devices in the second preferred embodiment which are the same as the first preferred embodiment are assigned the same labels, and same devices will therefore not be described again. Please refer to FIG. 4 and FIG. 5. FIG. 4 is a schematic diagram illustrating a cross-sectional structure of a touch device according to a second preferred embodiment of the present invention. FIG. 5 is a schematic diagram illustrating the touch device according to the second preferred embodiment of the present invention. As shown in FIG. 4 and compared with the first preferred embodiment, the touch device 100 of this embodiment further includes a patterned transparent floating electrode layer 102 and a first insulating layer 104. The patterned transparent floating electrode layer 102 is disposed between the first substrate 12 and the patterned sensing electrode structure 106, and the second insulating layer 104 is disposed between the patterned transparent floating electrode layer 102 and the patterned sensing electrode structure 106. It should be noted that the patterned transparent floating electrode layer 102 is not electrically connected to any other power source, which means that the patterned transparent floating electrode layer 102 is in a floating state. In addition, the patterned transparent floating electrode layer 102 can be composed of transparent conductive materials, such as ITO or IZO, but the embodiment is not limited to this. Furthermore, as shown in FIG. 5, the patterned transparent floating electrode layer 102 includes a plurality of electrode sections 108, respectively corresponding to at least one sensing pad 56. In this embodiment, each electrode section 108 corresponds to the sensing pad 56 in a first sensing series or in a second sensing series. Each electrode section 108 of the present invention is not limited to correspond to only one sensing pad. In another embodiment, each electrode section 108 can correspond to two adjacent sensing pads in one of the first sensing series. In another embodiment, each electrode section 108 can correspond to two adjacent sensing pads in one of the second sensing series. In a further embodiment, each electrode section 108 also can correspond to four adjacent sensing pads arranged as a matrix formation. Two of the four adjacent sensing pads are disposed in one of the first sensing series, and the other two of the four adjacent sensing pads are disposed in one of the second sensing series.

Furthermore, it should be noted that another difference between this embodiment and the first preferred embodiment is that the patterned sensing electrode structure 106 of this embodiment includes a plurality of second horizontal line portions 110 disposed along the second horizontal direction 42, and a plurality of first horizontal line portions 112 disposed along the first horizontal direction 40 and perpendicular to the second horizontal line portions 110. The first horizontal line portions 112 and the second horizontal line portions 110 respectively correspond to a portion of the patterned black matrix layer 46. A width of each of the first horizontal line portions 112 and the second horizontal line portions 110 can be smaller than a width of the corresponding portion of the patterned black matrix layer 46.

This embodiment disposes the patterned transparent floating electrode layer 102 between the sensing electrode structure 106 and the first substrate 12, and increases the area of the patterned transparent floating electrode layer 102 to raise the sensing capacitance between the touch input unit 62 and the patterned sensing electrode structure 106. Therefore, the intensity of the sensing signal sensed from the patterned sensing electrode structure 106 can be increased. In addition, this embodiment also reduces the width of the second horizontal line portions 110 and the first horizontal line portions 112 of the patterned sensing electrode structure 106 to increase the distance and the overlap between the patterned sensing electrode structure 106 and the patterned common electrode layer 34. Therefore, the coupling capacitance between the patterned sensing electrode structure 106 and the patterned common electrode layer 34 can be reduced, and the sensing signal generated from the patterned sensing electrode structure 106 can be prevented from being reduced by the coupling capacitor.

Figure 6:
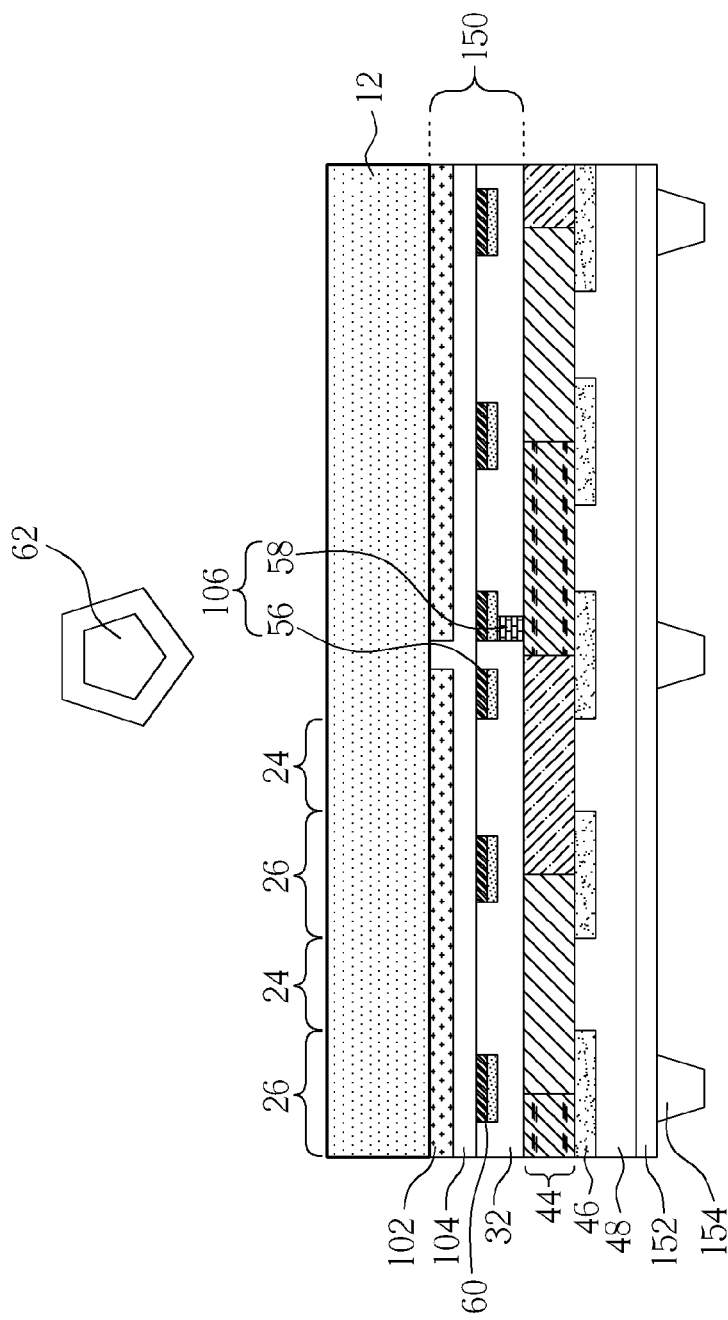
FIG. 6 is a schematic diagram illustrating a cross-sectional structure of a touch device according to a third preferred embodiment of the present invention.
Figure 7:
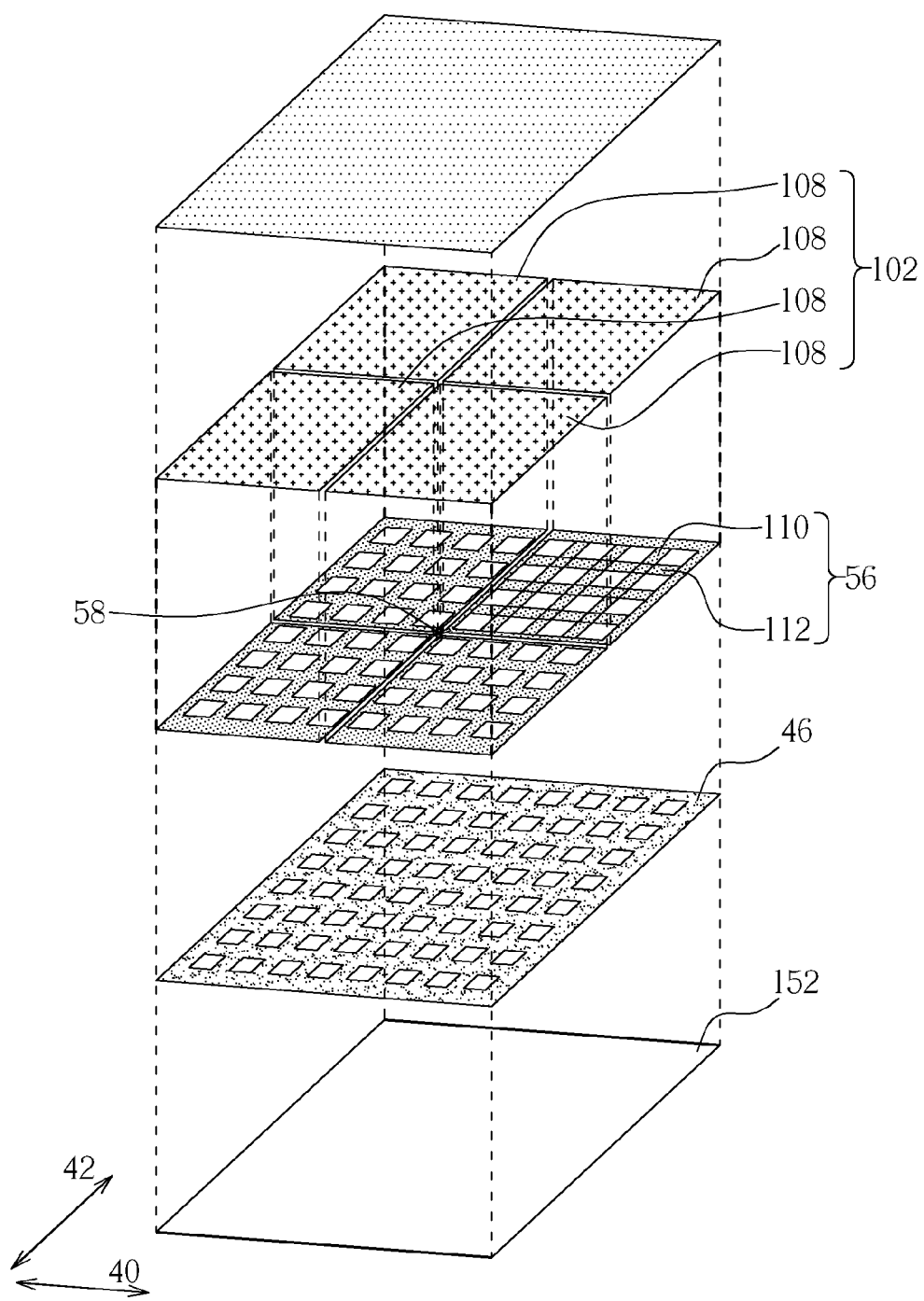
FIG. 7 is a schematic diagram illustrating a structure of the touch device according to the third preferred embodiment of the present invention.

Please refer to FIG. 6 and FIG. 7. FIG. 6 is a schematic diagram illustrating a cross-sectional structure of a touch device according to a third preferred embodiment of the present invention. FIG. 7 is a schematic diagram illustrating the touch device according to the third preferred embodiment of the present invention. In order to compare the difference between the embodiments, devices in the third preferred embodiment that are the same as the second preferred embodiment are assigned the same labels, and the same devices will not be described again. As shown in FIG. 6 and FIG. 7 and compared with the second embodiment, a common electrode layer 152 in the touch device 150 of this embodiment does not have a patterned structure. The common electrode layer 152 covers the third insulating layer 48, and the common electrode layer 152 is substantially flat. In addition, the spacer 154 of this embodiment is disposed on the common electrode layer 152 and in the light-shielding region 26.

As mentioned above, the present invention provides the patterned sensing electrode structure combined with the mesh structure of the patterned common electrode layer, and reduces the width of the patterned sensing electrode structure of the touch device so as to reduce the overlap or the distance between the patterned sensing electrode structure and the patterned common electrode layer. Therefore, the coupling capacitance between the patterned sensing electrode structure and the patterned common electrode layer can be reduced. Accordingly, the sensing signal generated from the patterned sensing electrode structure can be prevented from being reduced by the coupling capacitor. In addition, the present invention further provides the patterned transparent floating electrode layer to increase the sensing capacitance between the touch input unit and the patterned sensing electrode structure, so that the intensity of the sensing signal sensed from the patterned sensing electrode structure can be increased.

Those skilled in the art will readily observe that numerous modifications and alterations of the device and method may be made while retaining the teachings of the invention.

What is claimed is:

1. A touch display panel, comprising:
  a first substrate;
  a first sensing series including a plurality of first sensing pads for providing sensing signals;
  a second sensing series including a plurality of second sensing pads for receiving sensing signals;
    wherein both the first sensing series and the second sensing series are above the first substrate, wherein each of the first sensing pads and the second sensing pads has a plurality of sensing series openings, wherein the plurality of first sensing pads and the plurality of second sensing pads are alternately arranged in a first direction and a second direction, wherein a gap is provided between each adjacent first sensing pad and second sensing pad, wherein the first direction and the second direction are perpendicular to each other;
  a first insulating layer, covering the first sensing series and the second sensing series;
  a patterned black matrix layer, comprising a plurality of black matrix openings arranged in a matrix formation;
  a second insulating layer, covering the patterned black matrix layer; and
  a patterned common electrode layer;
  wherein said plurality of sensing series openings, said plurality of black matrix openings, and said patterned common electrode layer are overlapped; and
  wherein the patterned black matrix layer defines displaying regions and light-shielding regions, and the plurality of black matrix openings corresponds to the displaying regions.

2. The touch device of claim 1, wherein the patterned common electrode layer, disposed on the first insulating layer, comprises a plurality of electrode portions and a plurality of connecting portions, the plurality of electrode portions corresponds to the displaying regions, the connecting portions are disposed between the electrode portions and over the light-shielding region, and the connecting portions are electrically connected to the electrode portions.

3. The touch device of claim 1, wherein the first sensing series and the second sensing series have a plurality of bridge lines.

4. The touch device of claim 3, further comprising a patterned transparent floating-electrode layer, disposed between the first substrate and the plurality first sensing series.

5. The touch device of claim 4, wherein the patterned transparent floating-electrode layer comprises a plurality of electrode sections, respectively corresponding to at least one of the sensing pads.

6. The touch device of claim 1, wherein the patterned common electrode layer comprises a meshed pattern, wherein the meshed pattern is composed of electrode portions and connecting portions.

7. The touch device of claim 1, further comprising a patterned anti-reflective layer, disposed between the first sensing series and the first substrate, wherein the patterned anti-reflective layer overlaps the first sensing series and the second sensing series.

8. The touch device of claim 1, wherein the first sensing series is narrower than the patterned black matrix layer widthwise.

9. A touch display panel, comprising:
a first substrate;
a second substrate;
a liquid crystal layer, disposed between the first substrate and the second substrate;
a patterned sensing electrode structure, disposed above the first substrate, wherein the patterned sensing electrode structure is corresponding to a light-shielding region and exposing displaying regions;
a first insulating layer, covering the patterned sensing electrode structure; and
a patterned common electrode layer, disposed on the first insulating layer, comprising:
a plurality of electrode portions corresponding to the displaying regions; and
a plurality of connecting portions;
wherein the connecting portions is disposed between the electrode portions and electrically connected to the electrode portions;
wherein the patterned common electrode layer comprises a meshed pattern, and the meshed pattern is composed of the electrode portions and the connecting portions; and
wherein the connecting portion has a first width, the electrode portion has a second width, and the first width is different from the second width.

10. The touch display panel of claim 9, wherein the patterned sensing electrode structure comprises a first sensing series for providing sensing signals and a second sensing series for receiving sensing signals.

11. The touch display panel of claim 10, wherein the first sensing series includes a plurality of first sensing pads and the second sensing series includes a plurality of second sensing pads, wherein each sensing pad has a plurality of sensing series openings corresponding to the displaying regions.

12. The touch display panel of claim 11, further comprising a patterned transparent floating-electrode layer, disposed between the first substrate and the patterned sensing electrode structure.

13. The touch display panel of claim 11, wherein the patterned transparent floating-electrode layer comprises a plurality of electrode sections, respectively corresponding to at least one of the sensing pads.

14. The touch display panel of claim 10, further comprising a patterned anti-reflective layer, disposed between the patterned sensing electrode structure and the first substrate, wherein the patterned anti-reflective layer overlaps with the first sensing series and the second sensing series.

15. The touch display panel of claim 9, further comprising:
a color filter layer, disposed on the first insulating layer;
a patterned black matrix layer, disposed on the color filter layer, wherein the patterned black matrix layer exposes the displaying regions; and
a third insulating layer, covering the patterned black matrix layer and the color filter layer.

16. The touch display panel of claim 15, wherein the patterned sensing electrode structure is narrower than the patterned black matrix layer.

17. The touch device of claim 3, wherein the plurality of first sensing pads are connected to each other via a plurality of first bridge lines, the plurality of second sensing pads are connected to each other via a plurality of second bridge lines, wherein the plurality of first sensing pads, the plurality of second sensing pads, and the plurality of first bridge lines are disposed on a first layer, and wherein the plurality of second bridge lines are disposed on a second layer.

18. The touch device of claim 6, wherein the connecting portion has a first width, the electrode portion has a second width, and the first width is different from the second width.

19. The touch device of claim 11, wherein the plurality of first sensing pads are connected to each other via a plurality of first bridge lines, the plurality of second sensing pads are connected to each other via a plurality of second bridge lines, wherein the plurality of first sensing pads, the plurality of second sensing pads, and the plurality of first bridge lines are disposed on a first layer, wherein the plurality of second bridge lines are disposed on a second layer.

* * * * *